(12) United States Patent
    Goates (10) Patent No.: US 10,577,040 B1
(45) Date of Patent: Mar. 3, 2020

(54) DEVICE AND METHOD OF ADAPTING BICYCLE CARRIER AS MAINTENANCE STAND

(71) Applicant: Eldon L. Goates, Colorado Springs, CO (US)

(72) Inventor: Eldon L. Goates, Colorado Springs, CO (US)

( * ) Notice: Subject to any disclaimer, the term of this patent is extended or adjusted under 35 U.S.C. 154(b) by 0 days.

(21) Appl. No.: 16/134,487

(22) Filed: Sep. 18, 2018

Related U.S. Application Data

(60) Provisional application No. 62/560,695, filed on Sep. 20, 2017.

(51) Int. Cl.
| *B60R 9/10* | (2006.01) |
| *B62H 3/12* | (2006.01) |
| *B62H 3/06* | (2006.01) |
| *B60R 9/06* | (2006.01) |

(52) U.S. Cl.
 CPC ............... *B62H 3/12* (2013.01); *B60R 9/06* (2013.01); *B60R 9/10* (2013.01); *B62H 3/06* (2013.01)

(58) Field of Classification Search
 CPC .... B60R 9/10; B60R 9/06; B62H 3/12; B62H 3/06
 See application file for complete search history.

(56) References Cited

U.S. PATENT DOCUMENTS

| 2,460,945 | A | | 2/1949 | Nighthart | |
| 5,385,280 | A | | 1/1995 | Littlepage et al. | |
| 5,498,015 | A | * | 3/1996 | Trout | B62H 3/00 |
| | | | | | 211/22 |
| 5,579,972 | A | * | 12/1996 | Despain | B60R 9/06 |
| | | | | | 224/506 |
| 5,765,821 | A | * | 6/1998 | Janisse | B25H 1/0014 |
| | | | | | 269/16 |
| 6,547,116 | B2 | | 4/2003 | Anderson et al. | |
| 6,626,340 | B1 | | 9/2003 | Burgess | |
| 7,104,430 | B2 | | 9/2006 | Reeves | |
| 7,222,763 | B2 | | 5/2007 | Pedrini | |
| 7,815,084 | B2 | | 10/2010 | Allen et al. | |
| 9,555,744 | B1 | * | 1/2017 | Roth | B60R 9/10 |
| 2002/0117526 | A1 | * | 8/2002 | Anderson | B60R 9/06 |
| | | | | | 224/536 |
| 2017/0021885 | A1 | * | 1/2017 | Montague | B62H 1/04 |

* cited by examiner

*Primary Examiner* — Corey N Skurdal
(74) *Attorney, Agent, or Firm* — Linda Flewellen Gould (57) ABSTRACT

The present invention provides a device and method for adapting a vehicle-mounted bicycle carrier to function as a stand for holding the bicycle to perform maintenance and repairs. A bicycle carrier attachment is provided which may be added to or manufactured as a part of a typical vehicle-mounted bicycle carrier. The attachment consists of a cradle with an open channel to receive and support an axle of the bicycle, an attachment device for attaching the cradle to the carrier, and a mechanism for elevating or lowering the cradle and thus the axle supported by the cradle. When the cradle is elevated, the bicycle is held in a position that allows the wheel surrounding the lifted axle to freely rotate, as is useful for maintenance functions.

13 Claims, 9 Drawing Sheets

DEVICE AND METHOD OF ADAPTING BICYCLE CARRIER AS MAINTENANCE STAND

REFERENCE TO RELATED APPLICATIONS

This is a non-provisional application for the invention disclosed in U.S. Provisional Application Ser. No. 62/560,695 filed Sep. 20, 2017.

BACKGROUND OF THE INVENTION

Field of the Invention

The present invention relates to a specialized device and method for adapting a bicycle carrier attached to a vehicle to allow the carrier to serve not only for transportation of a bicycle but also for servicing the bicycle while supported by the carrier. Many typical vehicle-mounted bicycle carriers can be adapted to hold a bicycle during maintenance and repairs, so the bicycle can be easily serviced after transport without carrying a separate maintenance stand.

Description of the Prior Art

Bicycles are often transported on vehicles using carriers or racks attached to the exterior of the vehicle. Once the bicycle is transported to a location for biking, it is often desirable to perform basic maintenance functions, such as lubricating the bicycle chain, cleaning road grime off the bicycle, or adjusting the brakes or derailleur. Therefore, it can be useful to also transport a bicycle stand to be set up in the location where the bike ride will begin, to hold the bicycle in a position and condition for servicing. When a bicycle stand is not available, the cyclist may resort to placing the bicycle upside down on the ground, asking another person to hold one wheel of the bicycle in the air, or hanging one wheel of the bicycle from a tree, all of which may facilitate servicing but in an awkward manner.

To avoid the hassle of transporting, setting up, and then putting away a separate bicycle stand, it is advantageous to have a method of converting a vehicle-mounted bicycle carrier to allow the carrier itself to function as a maintenance stand.

Stands for holding bicycles during servicing are well known in the prior art. For example, U.S. Pat. No. 2,460,945 to Nighthart teaches a bicycle stand which can be set up on level ground and then attached to a bicycle frame in multiple places, allowing the bicycle to be moved into multiple positions for ease of servicing. The Nighthart device is illustrative of the type of bicycle stand which could be transported, set up, and eventually put away to service a bicycle after transport, but only if there is room in the vehicle to carry the separate stand.

The bicycle stand described in U.S. Pat. No. 5,385,280 to Littlepage et al. is designed to clamp onto a bicycle frame to hold the bicycle in a position suitable for servicing, possibly in a location to which the bicycle has been transported. Thus, the Littlepage device is fashioned to attach to a trailer hitch of the vehicle which transported the bicycle. However, if the bicycle carrier by which the bicycle was transported is attached to the rear of the vehicle, as is frequently the case, that bicycle carrier must be removed from the vehicle or moved away from the trailer hitch to allow the Littlepage stand to be attached to the trailer hitch during servicing, and then repositioned on the vehicle after the bicycle stand is put away. The need to both move the bicycle carrier from the rear of the vehicle and attach the bicycle stand, and to reverse that process after the bicycle has been serviced, arguably creates more hassle than using a traditional maintenance stand that sits on the ground.

U.S. Pat. No. 6,547,116 to Anderson et al. teaches a bicycle carrier which is intended to also serve as a maintenance stand. The Anderson carrier attaches to a horizontal bar of the bike frame which is typically referred to as the bicycle frame top tube. No support is provided by this carrier for the wheels of the bicycle, which has the advantage of allowing the wheels to be rotated for servicing, but the disadvantage of allowing significant movement of the bicycle during transport. It is particularly cumbersome to attach the bicycle to the Anderson carrier when the bicycle is small (such as a children's bicycle), a women-specific bicycle without a horizontal frame top tube, a specialty bicycle, or a bicycle with shocks or linkages attached in the area of the top tube. Thus, it is advantageous to provide for different styles of bicycles to be transported with wheels supported by a platform of the carrier, while allowing one wheel to be elevated for maintenance, with the bicycle in a generally upright position.

In contrast to the Anderson carrier, the vehicle-mounted carriers of U.S. Pat. No. 7,222,763 to Pedrini and U.S. Pat. No. 7,815,084 to Allen et al. provide support for the wheels of one or more bicycles during transport. The bicycle is thus held securely when the vehicle is in motion, but is also held in a position which hinders rotation of the wheels and thus the capability to service the bicycles. The Pedrini and Allen bicycle carriers are illustrative of carriers that could be modified by the instant invention to allow servicing while the bicycle is held on the carrier.

Other specialized bicycle racks are known in the prior art. For example, U.S. Pat. No. 7,104,430 to Reeves teaches a bicycle rack suitable for attachment to a bus to allow riders of public transportation to transport bicycles. U.S. Pat. No. 6,626,340 to Burgess describes a specialized bicycle carrier in which the bicycle is secured by a connection to the bicycle's pedal crank assembly.

Although vehicle-mounted bicycle carriers and separate vehicle maintenance stands are well known in the prior art, it is advantageous to provide a manner of modifying existing vehicle-mounted bicycle carriers, or providing a specialized carrier, that permits both secure transport of the bicycle and ease of servicing the bicycle after transport, without using a stand that is separate from the carrier or requires reconfiguration of the carrier prior to servicing the bicycle.

SUMMARY AND OBJECTS OF THE INVENTION

A primary object of the present invention is to provide a simple method for holding a bicycle on a vehicle-mounted bicycle carrier to service the bicycle, using the upright holding capabilities of the carrier.

Another object of the present invention is to provide a means for converting a standard vehicle-mounted bicycle carrier into a stand suitable for servicing the bicycle.

Yet another object of the present invention is to provide a vehicle-mounted bicycle carrier that can easily be used to hold a bicycle in a position suitable for servicing.

These objects are achieved by a bicycle carrier attachment that can be added to or originally manufactured as a part of a typical vehicle-mounted bicycle rack. The modification of a typical bicycle carrier is done in a manner that is both simple and economical. The resulting bike carrier can be easily used as a maintenance stand, as bicycles of many different sizes and shapes may be straightforwardly maneuvered into a stable position suitable for maintenance functions with minimum effort.

There are many different types of vehicle-mounted bicycle carriers known in the prior art. Many such carriers are attachable to the rear of the vehicle to provide a platform on which the bicycle wheels may be placed and restraining mechanisms which hold the bicycle in place as the vehicle moves. Such bicycle racks have the advantage of transporting the bicycle outside of the vehicle, in a location easy to access for placing the bicycle in the carrier and removing it.

The claimed bicycle carrier attachment consists of a cradle with an open channel to receive and support an axle or frame segment of the bicycle and an attachment device for attaching the cradle to a vehicle-mounted bicycle carrier. The attachment device may hold the cradle at a stationery position suitable for supporting the bicycle with one wheel above the platform of the bicycle rack. Alternatively, the attachment device may be movable by means of a positioning mechanism that allows the cradle to be elevated or lowered. When the bicycle is held in the cradle in its stationery or elevated position, a wheel of the bicycle is raised sufficiently to allow that wheel to freely rotate, as is useful for maintenance functions.

The bicycle carrier attachment can be connected to the vehicle-mounted carrier in a variety of ways, to allow for adapting an existing carrier or manufacturing a bicycle carrier with maintenance stand capability. In each case, the carrier attachment features a cradle with an open channel suitable for engaging and supporting one end of the bicycle to position one wheel so that wheel can be freely rotated. In a preferred embodiment, the cradle is suitable for receiving an axle of the bicycle in a position between a portion of the frame and the adjacent wheel, on a non-rotating portion of the axle. It is also possible for the cradle to engage and support a segment of the frame of the bicycle. When supporting bicycles with additional wheel hardware such as quick-release mechanisms, it is advantageous for the cradle to engage the axle or its connectors outside the frame.

To attach the cradle to the vehicle-mounted carrier, a bar may be pivotably connected at one end to the carrier, in a manner that allows the end of the bar which is not connected to the carrier to be pivoted between a raised position and lowered position. The cradle to support the bicycle is connected to the end of the bar which can be raised and lowered. When lowered, the bar may rest in a substantially horizontal position adjacent to the platform of the carrier. In that horizontal position, the pivoting bar and cradle are unlikely to interfere with a bicycle during transport. When the pivoting bar is raised, the end of the bar not connected to the carrier is elevated to allow the attached cradle to support the bicycle so that one wheel of the bicycle is above the platform and may freely rotate for servicing.

For example, while one wheel of the bicycle is supported by the bicycle carrier platform, the other wheel of the bicycle may be raised to place an axle in the elevated cradle, so that the cradle supports that axle and the wheel surrounding the axle in an elevated position in which the wheel freely rotates. The wheel of the bicycle which remains in the platform of the carrier can beneficially be restrained from movement, possibly by a stopping mechanism which is provided to hold the bicycle during transit, while the elevated wheel is securely held by the cradle in its elevated position.

It is also possible to adapt an existing bicycle carrier to serve as a maintenance stand by adding a stationery bar, attached at one end to the platform of the bicycle rack. The cradle suitable for supporting an axle or frame segment of the bicycle is then connected to the other end of that stationery bar. This provides a very simple way of modifying an existing bicycle rack to serve as a maintenance stand. However, a carrier attachment with a pivoting mechanism is more versatile, as a variety of different sized bicycles may be raised to a position suitable for servicing when the bar can pivot around its point of connection to the bicycle rack platform, allowing the bar to have different angles to and the cradle to have different distances from the carrier platform.

Some vehicle-mounted bicycle racks include one or more pivoting arms which are connected at one end to the platform of the carrier and can be moved into a position which allows a restraining device at the other end of the pivoting arm to engage and hold a bicycle stationery during transport. In one embodiment of the claimed invention particularly suitable for modifying such carriers to serve as a maintenance stand, a cradle for supporting one wheel of a bicycle in a free rotation position may be added to the movable end of the carrier's existing pivoting arm. For example, the cradle may be attached by means of a connecting mechanism which engages the movable end of the existing pivoting arm. This may be accomplished by joining the cradle to a hollow tube that slips over and snugly engages the movable end of the existing pivoting arm, or by other known connection mechanisms.

It is particularly advantageous to connect the cradle to the carrier's existing pivoting arm designed for restraining a second bicycle on a separate platform of the carrier. In this situation, the cradle should be connected to the existing pivoting arm at an angle which allows the freely rotating wheel of the bicycle to be supported in a different plane than the wheel of the bicycle held in the platform of the carrier. Mounting the cradle at an obtuse angle with respect to the existing pivoting arm is useful for achieving several purposes. The angled cradle is positioned to avoid interference when loading and unloading bicycles on the carrier. Attaching the cradle at such an angle allows the wheel of the bicycle which is elevated and supported by the cradle to be moved closer to or away from the vehicle to which the carrier is attached, instead of directly behind the other wheel of the bicycle, providing additional degrees of freedom in accessing that wheel. Such an angle of attachment may also beneficially allow the most secure possible connection to an existing pivoting arm which was designed to restrain a second bicycle over a different platform of the bicycle rack.

A preferred embodiment of the bicycle carrier attachment includes a cradle having an open channel with two edges supported on a cradle base. It is advantageous to form the channel of the cradle so that one of the channel edges extends further from the base of the cradle than the other edge. When the bar or pivoting arm to which the cradle is attached is in a horizontal position, there appears to be an upper longer edge and lower shorter edge of the open channel. When the cradle is pivoted into a raised position, the pivoting arm or bar supporting the cradle is typically at an acute angle with respect to the carrier platform. In that raised position, the two edges of the open channel, having different distances from the cradle base, are approximately the same distance from the platform of the carrier, providing stable support for an axle or bicycle frame segment resting in the cradle.

In the drawings, the following legend has been used:

| | |
|---|---|
| 10 | Bicycle Carrier Attachment |
| 12 | Cradle |
| 13 | Cradle base |
| 14 | Mechanism for attaching cradle to carrier |
| 16 | Mechanism for elevating and positioning cradle |
| 18 | Open channel |
| 20 | Upper longer edge of open channel |
| 22 | Lower shorter edge of open channel |
| 24 | Bar attachable to carrier |
| 26 | Stopping mechanism to hold bicycle in raised position |
| 28 | Vehicle |
| 30 | Vehicle-mounted bicycle carrier |
| 32 | Platform of bicycle carrier to hold bicycle wheels |
| 33 | Pivoting end of bicycle carrier arm |
| 34 | Bicycle carrier arm |
| 35 | Bicycle carrier arm restraining device |
| 36 | Bicycle |
| 38 | Bicycle Wheel |
| 40 | Bicycle axle |
| 42 | Bicycle frame |
| 48 | Pivotable end connection mechanism such as hollow tube |
| 50 | Cradle extension |
| 52 | Strap to hold rail to pivoting arm of carrier |
| 54 | Spacer between rail and pivoting arm |
| 56 | Angle of cradle extension to carrier pivoting arm |
| 58 | Rail to support cradle |
| 60 | Width of cradle |

DESCRIPTION OF THE PREFERRED EMBODIMENT

The present invention provides a method and device for adapting a vehicle-mounted bicycle carrier to serve as a maintenance stand, elevating and securing one wheel of the bicycle in a free rotation position while the other wheel remains supported by a platform of the bicycle carrier. In the following description, numerous specific details are set forth in order to provide a thorough understanding of the present invention. It will be obvious, however, to one skilled in the art that the present invention may be practiced with variations to or even without one or more of these specific details. Some well-known methods and structures have not been set forth in order not to unnecessarily obscure the description of the present invention.

Figure 1:
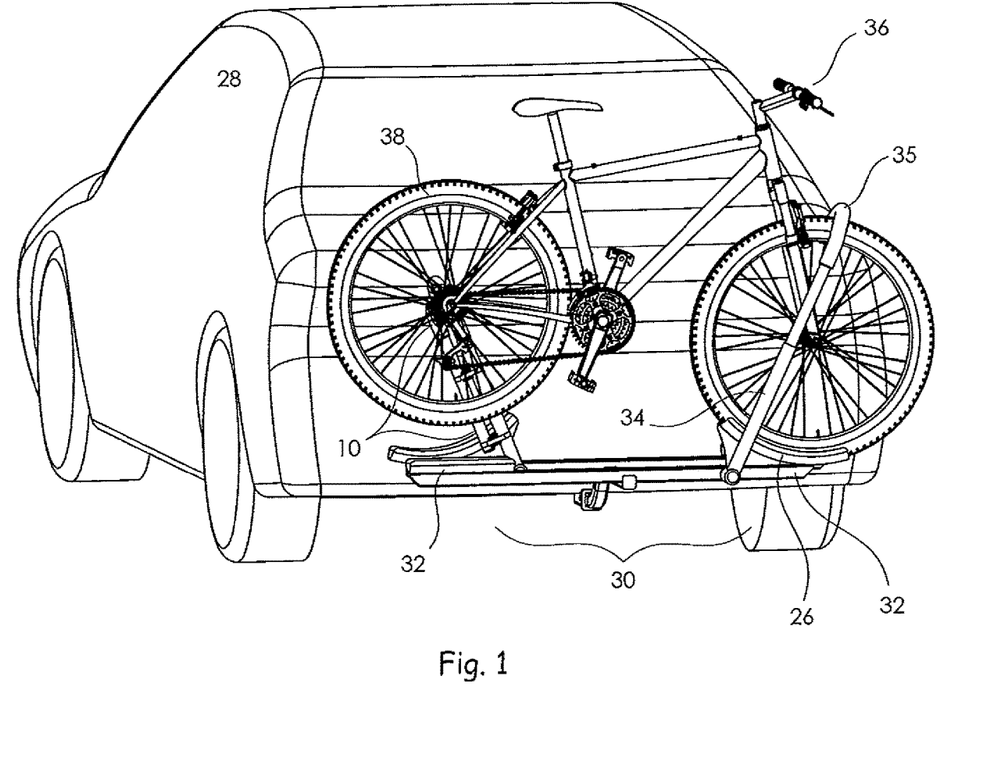
FIG. 1 is a front perspective view of the rear of a vehicle with a vehicle-mounted bicycle carrier, to which is connected a bicycle carrier attachment for adapting the carrier to serve as a maintenance stand, according to the present invention. The bicycle is elevated on the carrier so that one wheel can be freely rotated, to enable ease of maintenance functions.

As shown in FIG. 1, a vehicle-mounted bicycle carrier 30 connected to the rear of a vehicle 28 can be advantageously adapted for use as a maintenance stand. A bicycle carrier attachment 10, best shown in FIG. 2-7, can be added to or manufactured as a part of a bicycle carrier 30 to allow a bicycle 36 to be placed in a position which allows the bicycle 36 to be easily serviced. As shown in FIG. 1, the attachment 10 permits one wheel 38 of the bicycle 36 to be securely held in an elevated position in which that wheel 38 may freely rotate, to enable basic maintenance functions to be easily accomplished, such as lubricating the bicycle chain, cleaning road grime off the bicycle, or adjusting the brakes or derailleur. As will be evident in viewing the various types of bicycles 36 shown in the accompanying drawings, many different types and sizes of bicycles 36 can be serviced using the claimed method.

Figure 2:
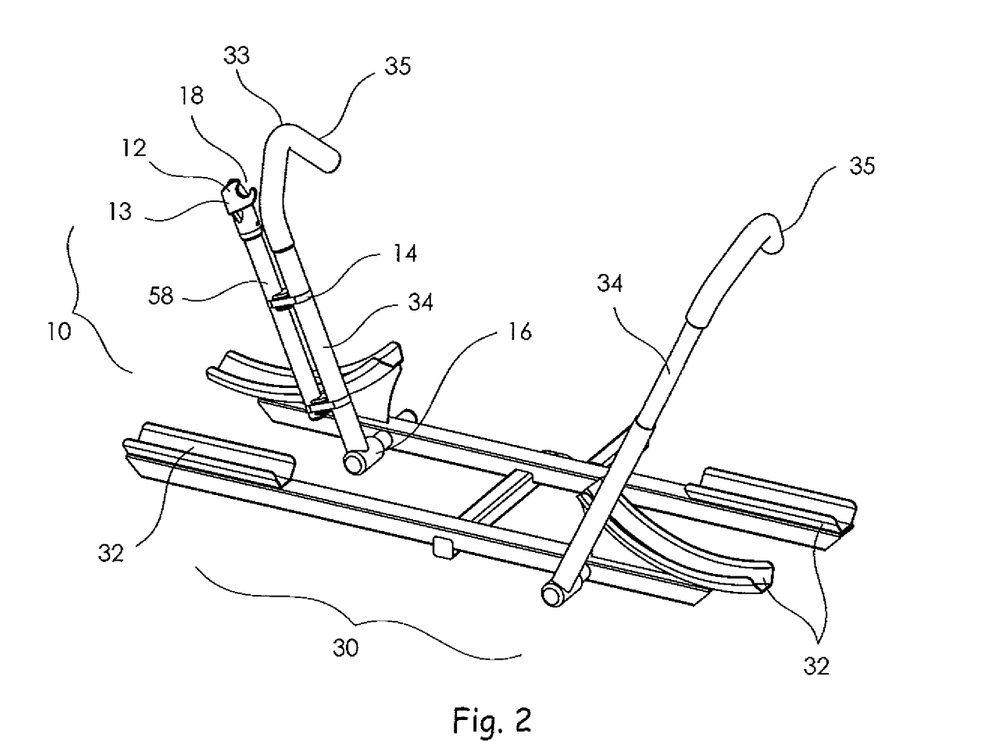
FIG. 2 is a front perspective view of a bicycle carrier, to which is connected a bicycle carrier attachment, according to the present invention.
Figure 3:
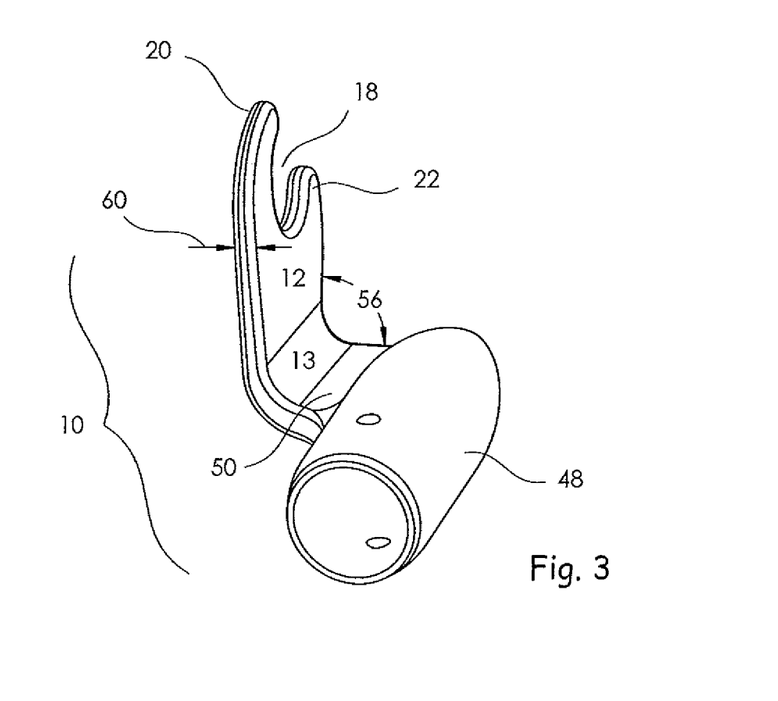
FIG. 3 is a front perspective view of a bicycle carrier attachment for supporting and elevating one wheel of a bicycle, according to the present invention.
Figure 7:
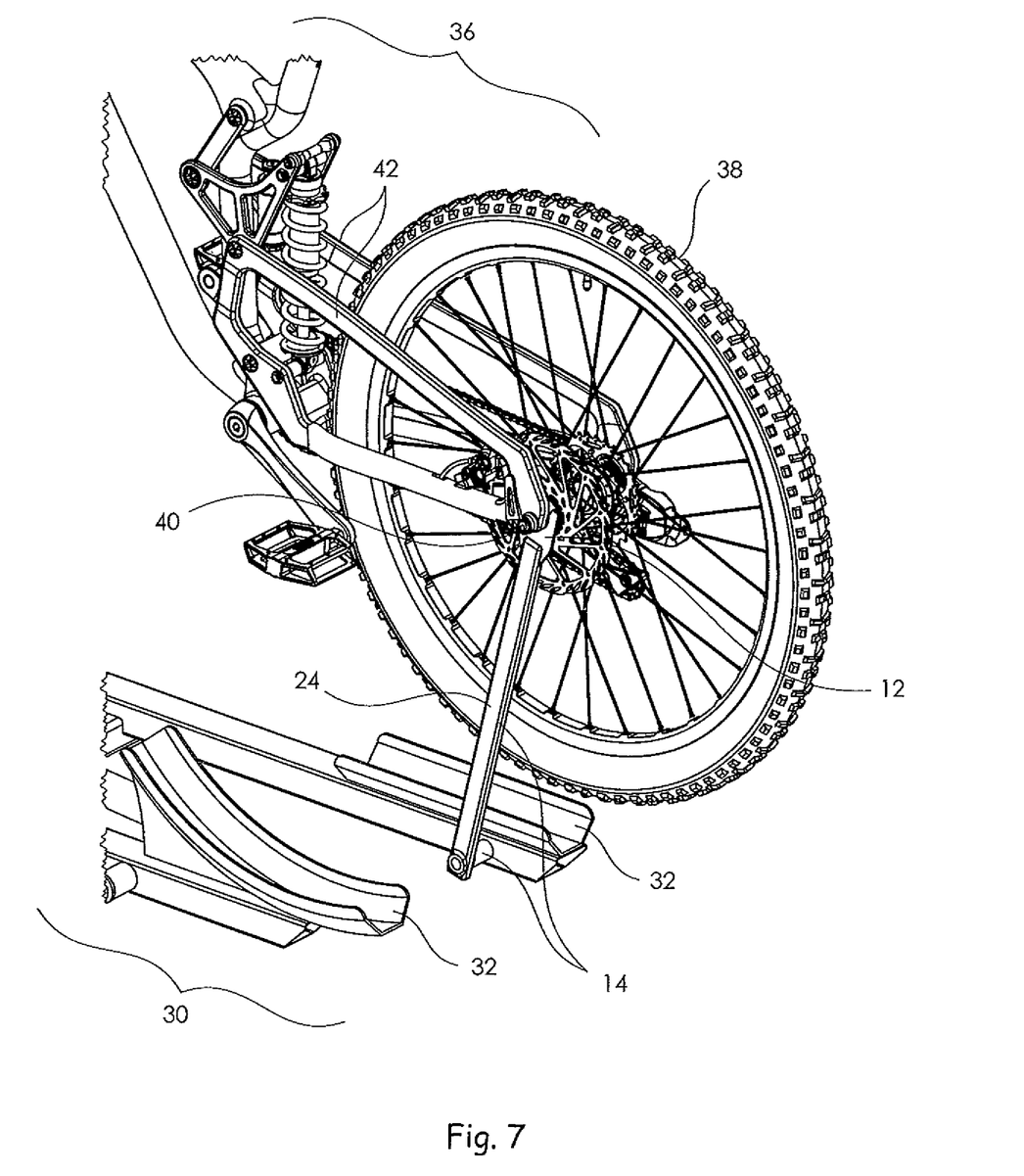
FIG. 7 is a partial side and perspective view of a bicycle supported by another embodiment of the bicycle carrier attachment of the present invention, connected to a bicycle carrier.
Figure 8:
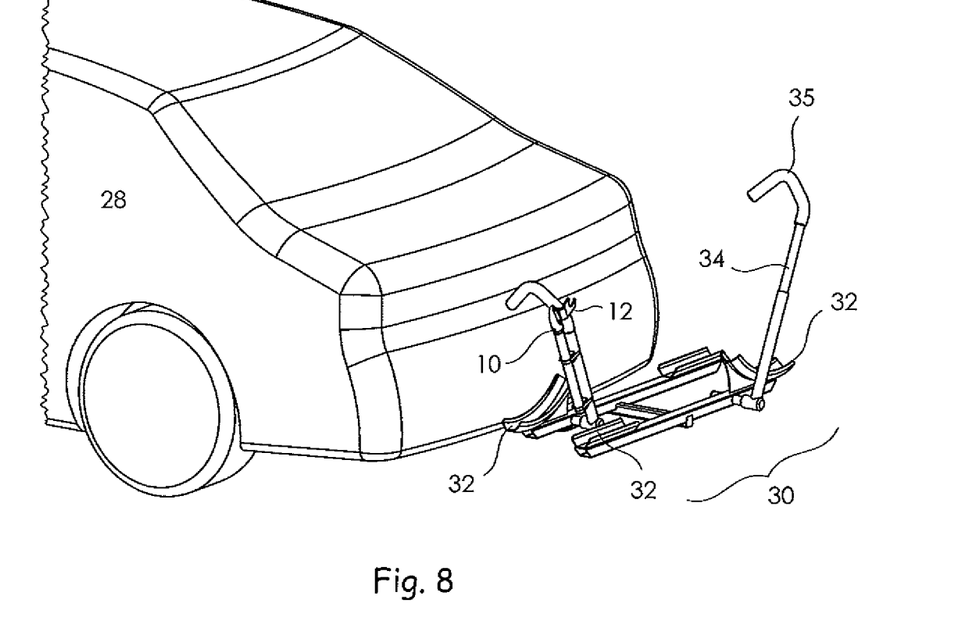
FIG. 8 is a front perspective view of the rear of a vehicle to which is attached a bicycle carrier with a bicycle carrier attachment for adapting the carrier to serve as a maintenance stand, according to the present invention.
Figure 9:
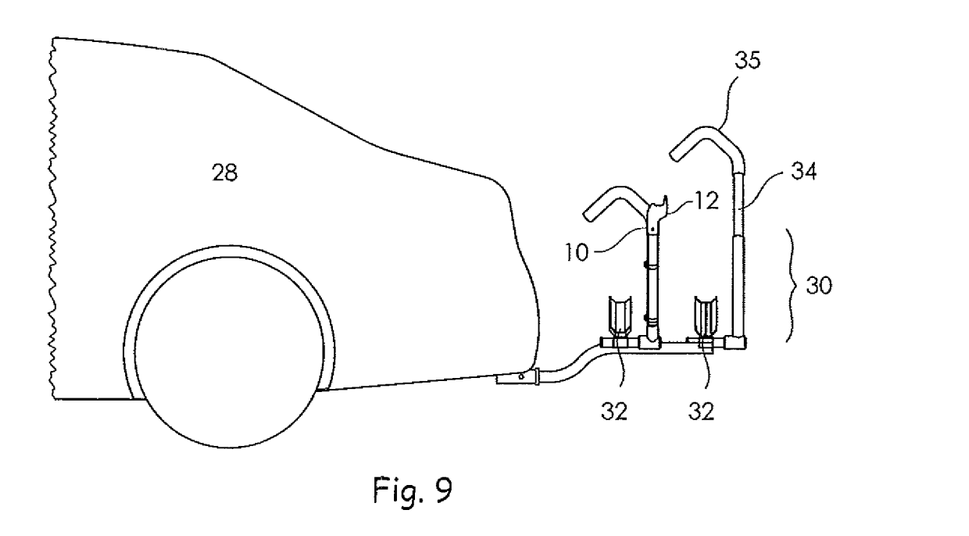
FIG. 9 is a side view of a vehicle and vehicle-mounted bicycle carrier, to which is connected a bicycle carrier attachment of the present invention.

As shown in FIG. 2, the bicycle carrier attachment 10 of the present invention includes a cradle 12 with an open channel 18 suitable for receiving an axle 40 or frame 42 of a bicycle 36 and an attachment mechanism 14 for attaching the cradle 12 to the carrier 30. The carrier attachment 10 may also include a positioning mechanism 16 for elevating and lowering the cradle 12. Before or after the cradle 12 has been positioned in an elevated position, a bicycle 36 may be moved adjacent to the carrier attachment 10 to engage and support an axle 40 or frame segment 42 by the cradle 12, as shown in FIG. 7. When the bicycle 36 is supported by the cradle 12, the bicycle 36 may beneficially be held by the cradle 12 in a free-rotation position in which one wheel 38 of the bicycle 36 may freely rotate.

Numerous convenient methods of attaching the cradle 12 to the carrier 30 can be utilized. Some specific attachment mechanisms 14 may fit most conveniently on a particular type of bicycle rack 30. One advantage of the claimed invention is that the carrier attachment 10 may be incorporated in a bicycle carrier 30 during manufacture or simply added to a pre-existing carrier 30.

Figure 5:
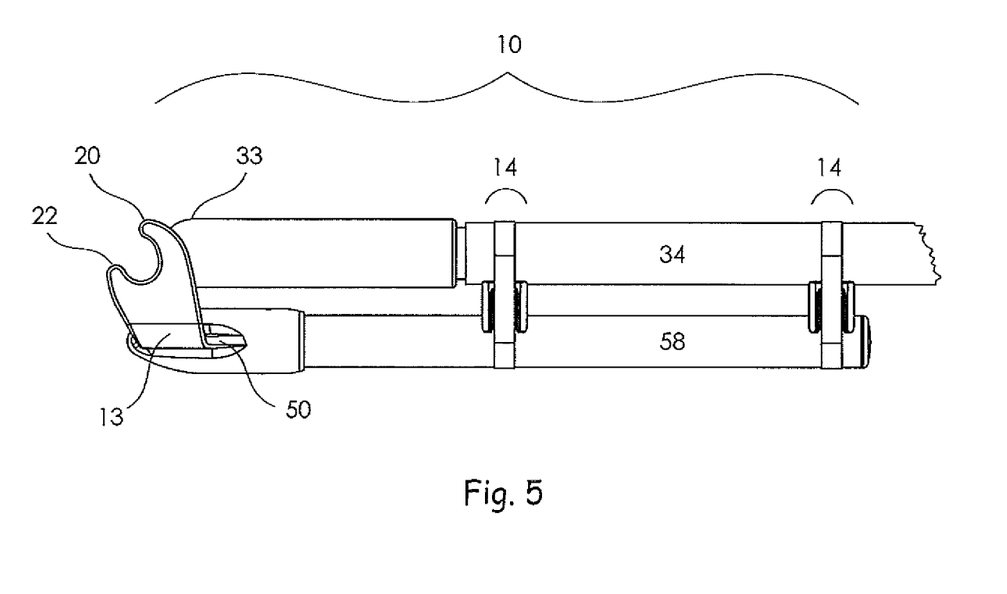
FIG. 5 is a side view of the bicycle carrier attachment shown in FIG. 4.
Figure 6:
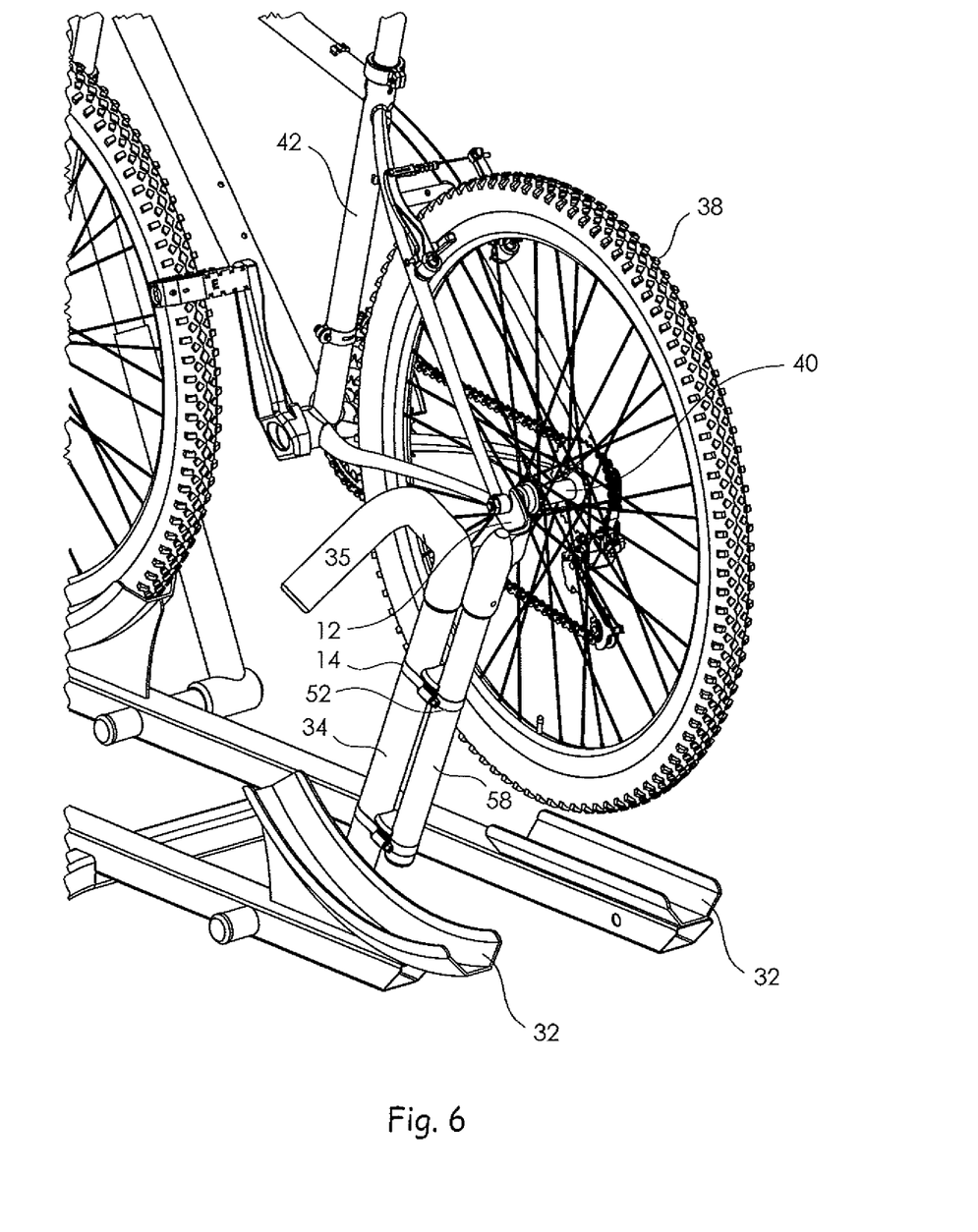
FIG. 6 is a partial side and perspective view of a bicycle supported by a bicycle carrier attachment of the present invention, connected to a bicycle carrier.
Figure 12:
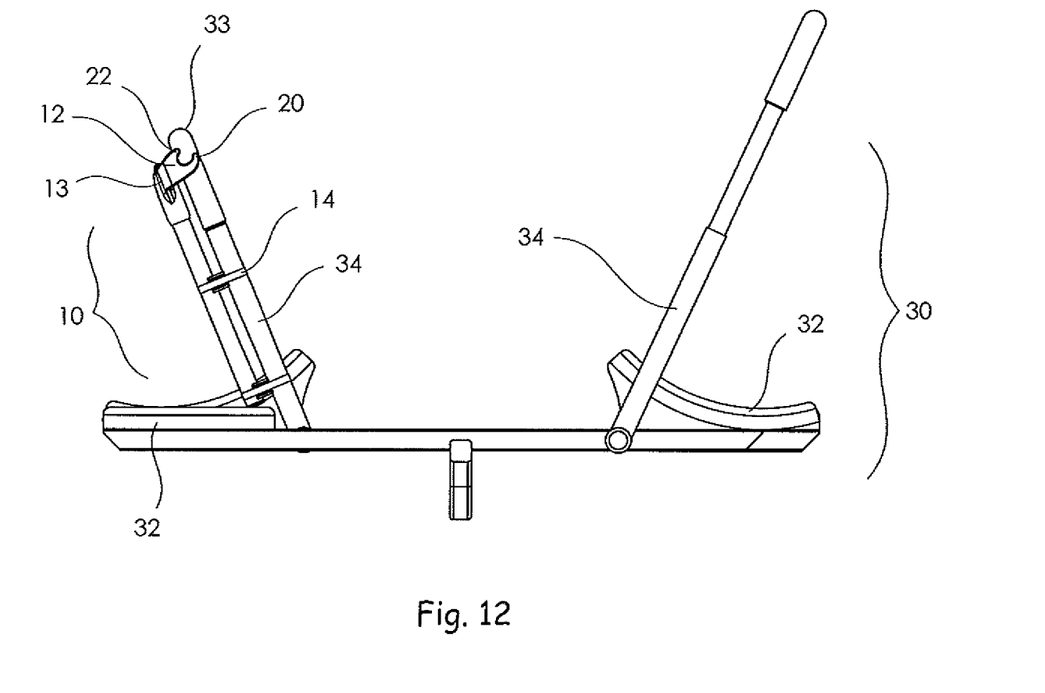
FIG. 12 is a front view of a bicycle carrier to which is connected a bicycle carrier attachment of the present invention.

For example, in a preferred embodiment shown in FIG. 2, the cradle 12 may be attached to a rail 58. That rail 58 can easily be strapped to an existing pivoting arm 34 of the carrier 30, as shown in FIG. 2, FIG. 5, and FIG. 12. The rail 58 may be attached to the existing pivoting arm 34 by any of numerous connection or strapping methods known in the industry. A spacer 54 may be provided to hold the rail 58 at a convenient distance from the carrier's pivoting arm 34, and straps 52 used to secure the rail 58 parallel to the pivoting arm 34, as shown in FIG. 5.

Typically, the carrier's pivoting arm 34 has one end attached to the carrier platform 32 in a pivoting fashion, allowing the opposite end 33 of the pivoting arm 34 to pivot between a position in which the pivoting arm 34 is adjacent to the carrier platform 32 and a raised position in which a restraining device 35 can be clamped onto a bicycle 36 to secure the bicycle 36 during transit. Thus, using the pivoting feature of the carrier's own pivoting arm 34 becomes the mechanism 16 for positioning the cradle 12 attached to that pivoting arm 34. When the cradle 12 and attached rail 58 are connected to a pivoting arm 34 of the carrier 30, moving that pivoting arm 34 in the manner intended for restraining a bicycle 36 during transit becomes the positioning mechanism 16 for raising and lowering the cradle 12.

Figure 4:
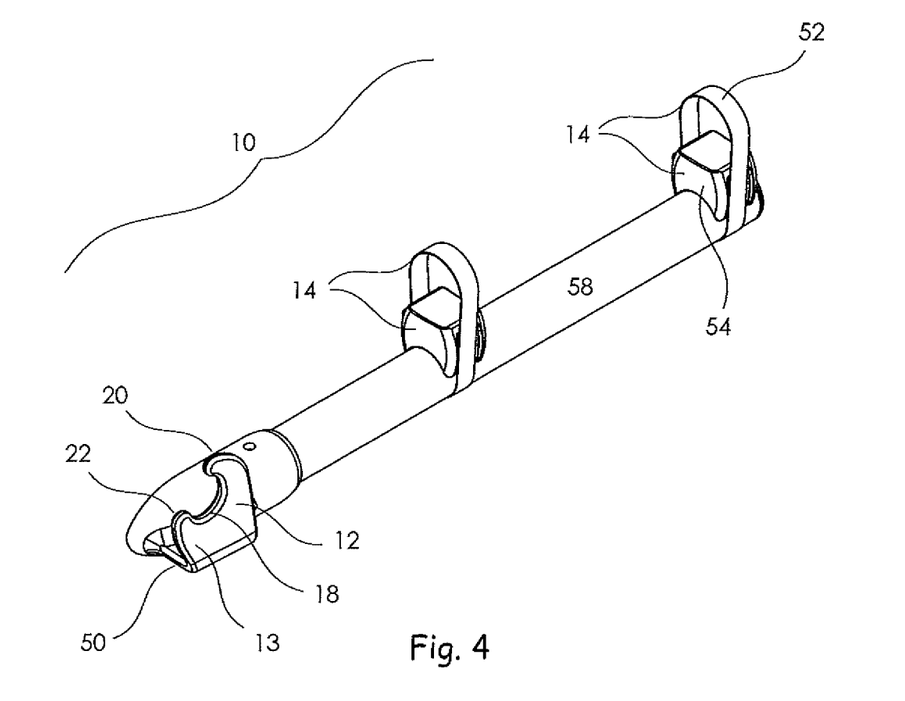
FIG. 4 is a front perspective view of another embodiment of a bicycle carrier attachment, according to the present invention.

In some bicycle racks 30 available commercially, the cradle 12 of the bicycle carrier attachment 10 may be connected directly to the pivoting end 33 of the pivoting arm 34, without using the rail 58 shown in FIG. 4 and FIG. 5. This attachment mechanism 14 is particularly useful when the restraining device 35 is positioned on the pivoting arm 34 in a location other than the pivoting end 33. For example, the cradle 12 design shown in FIG. 3 includes an open channel 18, a cradle base 13, a cradle extension 50, and a pivoting end connection device 48. The pivoting end connection device 48 may conveniently be a hollow tube which slips onto and snugly engages the pivoting end 33 of the pivoting arm 34.

Figure 10:
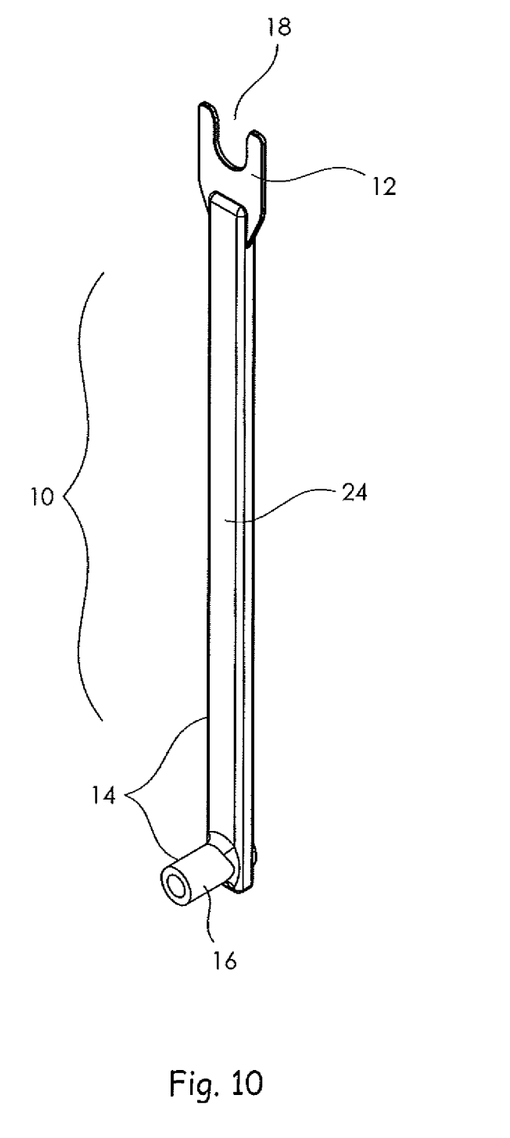
FIG. 10 is a front perspective view of another embodiment of a bicycle carrier attachment, according to the present invention.
Figure 11:
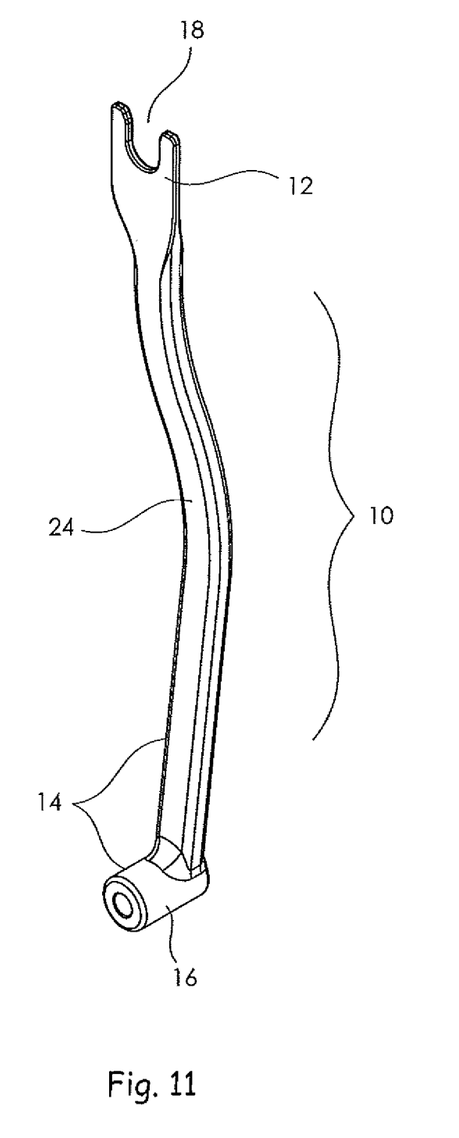
FIG. 11 is a front perspective view of another embodiment of a bicycle carrier attachment, according to the present invention.

In an alternative embodiment, the attachment mechanism 14 for the cradle 12 may be a separate bar 24 which is added to the bicycle rack 30, as best shown in FIG. 7, FIG. 10, and FIG. 11. Such a bar 24 may be conveniently added to an existing vehicle-mounted bicycle carrier 30 in a stationery significantly-vertical position or in a manner that allows the bar 24 to pivot around a point of attachment to the carrier platform 32. A pivoting bar 24 may rest in a horizontal position adjacent to the platform 32 during transit, but be manually pivoted into a raised position at a right angle or an acute angle to the carrier platform 32 to raise the cradle 12, poised to receive and support an axle 40, allowing the wheel 38 surrounding that axle 40 to freely rotate.

The bar 24 may be straight, as shown in FIG. 10, or a specialized configuration, an example of which is shown in FIG. 11. The specialized design of FIG. 11 may be connected to one carrier platform 32 of a multiple-bike carrier 30, to engage and support the axle 40 of a bicycle 36 with a restrained wheel 38 in a different platform 32 of the carrier 30.

The bar 24 may also be attached to the carrier platform 32 in a stationery manner which does not allow the bar 24 to pivot or move. Although this configuration limits the number of different sized bicycles 36 that can be held in an elevated position, it is a very simple way of modifying an existing carrier 30 to allow a particular bicycle 36 to be held in an ideal position for servicing.

The cradle 12 may be stably held in a raised position shown in FIG. 1 by securing the bicycle wheel 38 still resting in the carrier platform 32 to that platform 32. Held in the carrier platform 32 in the same manner as during transport, the restrained wheel 38 acts as a stopping mechanism 26 to prevent the pivoting bar 24 or pivoting arm 35 to which the cradle 12 is attached from further movement, as the axis of pivoting requires more latitude of movement to lower back to a horizontal position. If the carrier 30 restrains the bicycle 38 during transit by a connection to the frame 42, that same restraint can be used as a stopping mechanism 26 to hold the bicycle 36 in a raised position, instead of restraining the lower wheel 38.

The cradle 12 is particularly advantageous for ease of mounting and supporting a bicycle axle 40 when the open channel 18 is substantially parallel to the bicycle frame 42 and the width 60 of the cradle 12 is small enough to fit between the wheel 38 of the bicycle and the adjacent fork of the bicycle frame 42. When so constructed, the bicycle 36 is supported by resting the axle 40 in the open channel 18. A cradle 12 with an open channel 18 sufficiently large to receive a segment of the bicycle frame 42 is also possible, but such a cradle 12 would best be positioned substantially perpendicular to the pivoting arm 34 or bar 24, to engage the bicycle frame 42 while the bicycle 36 is substantially parallel to the arm 34 or bar 24.

The cradle 12 may be beneficially designed with edges 20, 22 of different heights. As shown in FIG. 5, when the pivoting bar 24 or pivoting arm 34 is in a horizontal position, the upper edge 20 of the open channel 18 is further from the cradle base 13 than the lower edge 22. Thus, when the pivoting bar 24 or pivoting arm 34 is positioned with the pivoting end 33 and cradle 12 in an elevated position, each edge 20, 22 is a similar distance from the carrier platform 32, as shown in FIG. 12, to most securely support the bicycle 36 in an elevated position.

Figure 13:
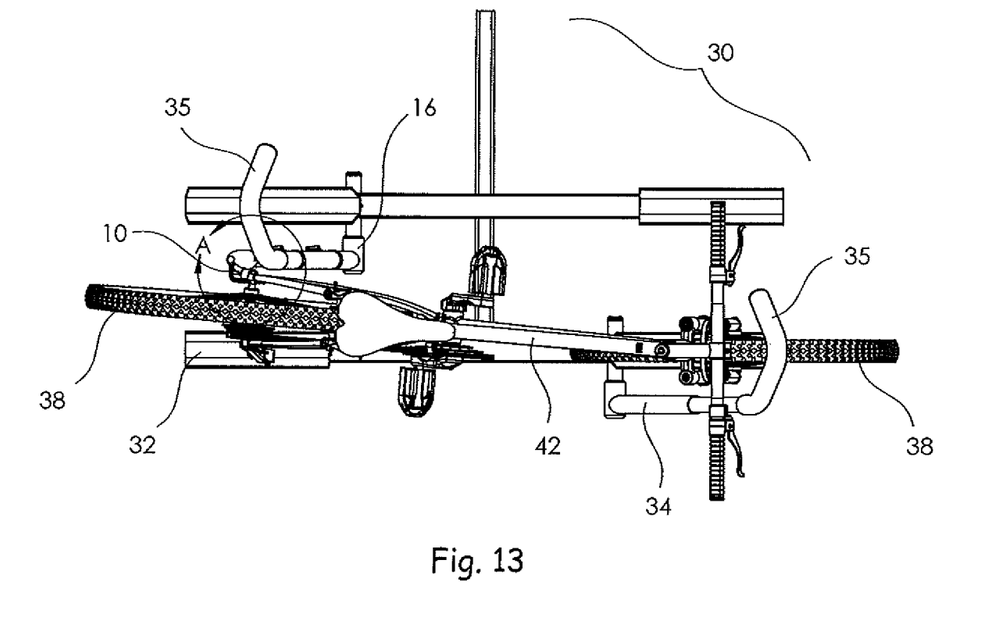
FIG. 13 is a top view of a bicycle carrier to which is connected a bicycle carrier attachment of the present invention.
Figure 14:
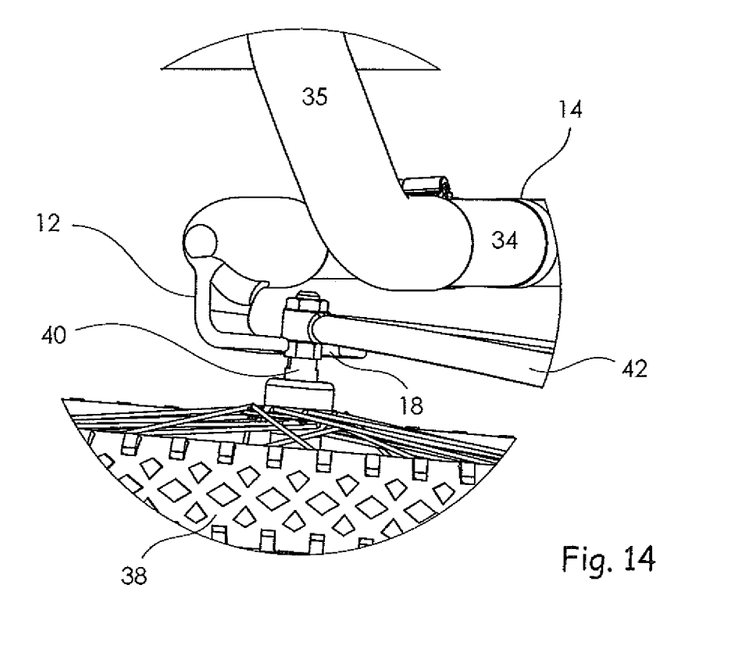
FIG. 14 is a magnified view of the circular area designated as "A" in FIG. 13.

When adapting a carrier 30 that is built to transport multiple bicycles 36 in parallel fashion, it may be useful to move the wheel 38 to be elevated into a different plane than the wheel 38 remaining in the carrier platform 32, as shown in FIG. 13. When the wheel 38 to be freely rotated is moved closer to a portion of the carrier platform 32 designed to transport a separate bicycle, the carrier's existing pivoting arm 34 designed for restraining the second bicycle can be used to support the cradle 12 and support the bicycle axle 40. In this situation, the cradle 12 should be connected to the pivoting arm 34 at an angle 56 which allows the freely rotating wheel 38 to be supported closer to the plane intended for transport of a second bicycle. Mounting the cradle 12 at an obtuse angle with respect to the existing pivoting arm 34 allows the wheel 38 of the bicycle 36 which is elevated and supported by the cradle 12 to be easily accessed for maintenance. Such an angle of attachment 56 may also allow the most secure possible connection to the existing pivoting arm 34 which was designed to restrain a second bicycle over a different platform 32 of the bicycle carrier 30.

Although the present invention has been described in terms of the presently preferred embodiments, it is to be understood that such disclosure is purely illustrative and is not to be interpreted as limiting. Consequently, without departing from the spirit and scope of the invention, various alterations, modifications, or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

I claim:

1. A device suitable for attaching to a vehicle-mounted bicycle carrier, the carrier being suitable for transporting a bicycle with a frame, two axles, and two wheels, the carrier having a platform to support the wheels of the bicycle during transport, comprising:

a. cradle having open channel to receive and support an axle of the bicycle while said axle and a wheel surrounding said axle is attached to the bicycle.
b. attachment means for attaching said cradle to the carrier, and
c. positioning means for elevating said cradle and the axle supported by said cradle to a free rotation position in which the wheel rotating around said axle rotates freely.

2. A device according to claim 1, said positioning means further comprising:
a. bar connected at one end to said cradle and pivotally connected at the other end to the carrier, so that said bar is pivotable between a generally horizontal position and a raised position in which said cradle is elevated, and
b. stopping means for holding said bar in said raised position.

3. A device suitable for attaching to a vehicle-mounted bicycle carrier, the carrier being suitable for transporting a bicycle with a frame, two axles, and two wheels, the carrier having a platform to support the wheels of the bicycle during transport, comprising:
a. cradle having open channel to receive and support an axle of the bicycle,
b. attachment means for attaching said cradle to the carrier,
c. positioning means for elevating said cradle and the axle supported by said cradle to a free rotation position in which the wheel rotating around said axle rotates freely, which positioning means further comprises a bar connected to one end to said cradle and pivotally connected at the other end to the carrier, so that said bar is pivotable between a generally horizontal position and a raised position in which said cradle is elevated, and
d. restraint mechanism separate from bar to restrain movement of the bicycle and hold said bar in said raised position.

4. A device suitable for attaching to a vehicle-mounted bicycle carrier, the carrier being suitable for transporting a bicycle with a frame, two axles, and two wheels, the carrier having a platform to support the wheels of the bicycle during transport and having a pivoting arm pivotable between a generally horizontal position and a raised position, comprising:
a. cradle having open channel to receive and support an axle and a wheel surrounding said axle of the bicycle while said axle is attached to the bicycle, and a cradle base generally opposite said channel, and
b. attachment means for attaching said cradle to the pivoting arm of the carrier, so that said cradle, the axle supported by the cradle, and the wheel which rotates around that axle are supported in a free rotation position in which said wheel rotates freely when the pivoting arm is positioned in the raised position.

5. A device according to claim 4, wherein said channel has two edges, one edge of which extends further from said cradle base than the other edge.

6. A device according to claim 4, wherein said cradle has a width suitable for supporting the bicycle axle between the bicycle frame and the wheel of the bicycle which rotates around said axle.

7. A device suitable for attaching to a vehicle-mounted bicycle carrier, the carrier being suitable for transporting a bicycle with a frame, two axles, and two wheels, the carrier having a platform to support the wheels of the bicycle during transport and having a pivoting arm pivotable between a generally horizontal position and a raised position, comprising:

a. cradle having open channel to receive and support an axle of the bicycle and a cradle base generally opposite said channel, and
b. attachment means for attaching said cradle to the pivoting arm of the carrier, so that said cradle, the axle supported by the cradle, and the wheel which rotates around the axle are supported in a free rotation position in which said wheel rotates freely when the pivoting arm is positioned in the raised position, wherein said attachment means further comprises:
i. pivotable end connection mechanism suitable for snugly engaging pivotable end of the pivoting arm which pivotable end is elevated when the pivoting arm is in the raised position, and
ii. cradle extension which extends from said cradle base to said connection mechanism, connecting said cradle base to said connection mechanism at an angle suitable for said cradle channel to receive and support said axle of the bicycle in said free rotation position.

8. A device according to claim 7, wherein said pivotable end connection mechanism comprises a hollow tube.

9. A device according to claim 8, wherein said cradle extension holds said cradle at an angle appropriate to allow the two wheels of the bicycle to be in different planes.

10. A device suitable for attaching to a vehicle-mounted bicycle carrier, the carrier being suitable for transporting a bicycle with a frame, two axles, and two wheels, the carrier having a platform to support the wheels of the bicycle during transport and having a pivoting arm pivotable between a generally horizontal position and a raised position, comprising:
a. cradle having open channel to receive and support an axle of the bicycle and a cradle base generally opposite said channel, and
b. attachment means for attaching said cradle to the pivoting arm of the carrier, so that said cradle, the axle supported by the cradle, an the wheel which rotates around that axle are supported in a free rotation position in which said wheel rotates freely when the pivoting arm is positioned in the raised position, wherein said attachment means further comprises:
i. rail suitable for connecting to the pivoting arm so the rail is parallel and adjacent to the pivoting arm,
ii. rail connecting means for connecting said rail to said pivoting arm, and
iii. cradle extension which extends from said cradle base to said rail, connecting said cradle base to said rail at an angle suitable for said cradle channel to receive and support the axle of the bicycle in said free rotation position.

11. A device according to claim 10, wherein said cradle extension holds said cradle at an angle appropriate to allow the two wheels of the bicycle to be in different planes.

12. A device suitable for attaching to a vehicle-mounted bicycle carrier, the carrier being suitable for transporting a bicycle with a frame, two axles, and two wheels, comprising:
a. cradle having open channel to receive and support a segment of the bicycle frame in a frame position which allows a wheel of the bicycle which is attached to the bicycle to be elevated and rotated when the bicycle frame is supported at that frame position,
b. attachment means for attaching said cradle to the carrier, and
c. elevating means for raising said cradle, the frame supported by the cradle, and the wheel.

13. A method of elevating one wheel of a bicycle having a frame, two axles, and two wheels while a nor-elevated wheel is secured to a vehicle-mounted bicycle carrier, the carrier having a platform for supporting the wheels of the bicycle during transport, comprising:
   a. securing the non-elevated wheel to the carrier while said non-elevated wheel is connected to the bicycle,
   b. supporting the axle around which the other wheel of the bicycle rotates by a cradle connected to the carrier while said axle is connected to the bicycle, and
   c. raising said cradle, the axle supported by the cradle, and the wheel which rotates around that axle to a free rotation position in which said wheel rotates freely.

* * * * *